(12) United States Patent
Kollbach et al.

(10) Patent No.: US 8,500,948 B2
(45) Date of Patent: Aug. 6, 2013

(54) PU ADHESIVES FOR STERILIZABLE COMPOSITE FILMS

(75) Inventors: Guido Kollbach, Apex, NC (US);
Norbert Bialas, Dormagen (DE);
Christoph Lohr, Mettmann (DE);
Andreas Brenger, Duesseldorf (DE);
Patrik Matusik, Duesseldorf (DE);
Thomas Kamm, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/114,387

(22) Filed: May 24, 2011

(65) Prior Publication Data

US 2012/0021227 A1    Jan. 26, 2012

(30) Foreign Application Priority Data

Dec. 9, 2008 (DE) .......................... 10 2008 060 885

(51) Int. Cl.
| | |
|---|---|
| *B29C 65/00* | (2006.01) |
| *B32B 37/00* | (2006.01) |
| *B32B 38/00* | (2006.01) |
| *B32B 27/00* | (2006.01) |
| *B32B 27/40* | (2006.01) |
| *C09J 4/00* | (2006.01) |
| *C09J 101/00* | (2006.01) |
| *C09J 201/00* | (2006.01) |

(52) U.S. Cl.
USPC ...... 156/331.7; 156/281; 156/332; 428/423.1

(58) Field of Classification Search
USPC ................ 156/281, 331.7, 332; 428/423.1
See application file for complete search history.

(56) References Cited

U.S. PATENT DOCUMENTS

| 2003/0215646 A1 | 11/2003 | Glasbrenner |
| 2004/0138402 A1 * | 7/2004 | Thiele et al. ............... 528/74.5 |
| 2006/0105187 A1 * | 5/2006 | Simons et al. ............... 428/483 |

FOREIGN PATENT DOCUMENTS

| DE | 4136490 | 5/1993 |
| EP | 1010519 | 6/2000 |
| EP | 0827995 | 11/2003 |
| EP | 1253159 | 7/2006 |
| EP | 1964868 | 9/2008 |
| WO | WO 2005/097861 | 10/2005 |

* cited by examiner

*Primary Examiner* — Michael Orlando
(74) *Attorney, Agent, or Firm* — James E. Piotrowski; Steven C. Bauman

(57) ABSTRACT

The invention relates to the use of a solvent-free, 2 component adhesive for adhering sterilizable composite films, wherein the adhesive comprises a component A made from at least one pre-polymer comprised of NCO groups, said pre-polymer produced from low molecular weight polyether alcohols, polyester alcohols and/or polyalkylene alcohols having a functionality of 2 or 3, implemented having a high molar excess of TDI and removal of the unimplemented monomer diisocyanate, and a component B comprising at least one 2 or 3 functional polyesterpolyol, produced from diols and/or triols on the basis of polyethers or polyalkylene diols implemented having dicarboxylic acids and derivatives thereof, wherein at least 10 to 40 wt % must be comprised of aliphatic $C_8$ to $C_{20}$ dicarboxylic acids, and auxiliary and additive materials in at least one component A or B.

16 Claims, No Drawings

PU ADHESIVES FOR STERILIZABLE COMPOSITE FILMS

This application is a continuation of international application PCT/EP2009/064981, filed on Nov. 11, 2009, which claims benefit of German Application 10 2008 060 885.8, filed on Dec. 9, 2008, the contents of each of which are incorporated herein by reference in their entirety.

The present invention relates to adhesives based on polyester polyols and high-molecular-weight diisocyanate prepolymers having a low concentration of monomeric diisocyanates, and to the use thereof for adhesive bonding of composite materials. These adhesively bonded substrates are then sterilization-capable, and exhibit a decreased quantity of migration-capable constituents.

Reactive polyurethane adhesives, in particular two-component-hardening systems, as a rule contain polymers having urethane groups and reactive isocyanate groups. For many applications, these compositions are solvent-free. An important criterion for using such adhesives in food packages or pharmaceutical products is the concentration of migration-capable constituents that, during storage, can travel out of the adhesive layer into the packaged material. This concentration needs to be very low, and below predetermined specific limit values.

It is not always easy to achieve these limit values, since it is not only the direct concentration of such constituents that is critical. Reaction products of the ingredients are often also what is considered an undesired constituent. An important criterion is the concentration of primary aromatic amines, which are commonly considered objectionable in terms of health. Such substances can occur not only in the context of chemical synthesis; it has been shown that certain processing conditions, such as heating, irradiation, or moisture impact, can also lead to breakdown reactions that form such migration-capable substances. One such processing step that is often necessary, however, is the sterilization of packages. Especially in the case of polyurethane adhesives, actions must be taken in this context in order to avoid the formation of aromatic polyamines. For example, the adhesively bonded substrates can be held for longer periods of time at elevated temperature. This promotes a reaction of the isocyanates with polymeric constituents, and less migration-capable constituents occur.

In addition, low-molecular-weight constituents of this kind, even if they are contained only as a contaminant or byproduct, often have an influence on processing properties. For example, low-molecular-weight byproducts can often decrease viscosity, and high-molecular-weight byproducts can considerably increase the viscosity. The adhesion properties of an adhesive can also be influenced. Solvents are furthermore often used as constituents of the adhesives. These result in easy application, but must be removed from the adhesive before bonding.

In order to prevent the formation of aromatic amines, it is usual for laminating adhesives for packages to be manufactured on the basis of aliphatic isocyanates. These isocyanates have a slower reaction time, however, so that particular actions must be taken (such as catalysts or temperature elevation) in order to ensure rapid bonding.

EP 1253159 is known. It describes a structural adhesive based on a polyurethane prepolymer that contains reactive aromatic isocyanate groups, a proportion of less than 2 wt % free polyisocyanate monomers being contained. The OH component of the adhesives is described only in generalized terms. Flexible adhesive bonds are not described.

EP 0827995 is also known. It describes a method for joining two substrates, a polyurethane melt adhesive being applied. The melt adhesive is intended to contain only a small proportion of unreacted aromatic isocyanate monomers. These are melt adhesives, i.e. they are applied at temperatures from 120 to 180° C. Only one-component adhesives, which crosslink via moisture, are described.

EP 1010519 is also known. This describes sterilizable composite films, these composite films being constructed from multiple layers. Laminating adhesives for joining the individual films are described; these adhesives can be solvent-containing, solvent-free, or aqueous systems. A specific selection of reactive two-component polyurethane adhesives is not described.

The polyurethane adhesives of the existing art are often not suitable as a laminating adhesive, since unsuitable viscosity behavior does not allow rapid application at a thin layer thickness. A low concentration of migration-capable aromatic amines is obtained by means of a long holding time at elevated temperature after processing. The sterilizability required in many applications is not ensured, i.e. that no delamination and adhesion degradation should occur under the process conditions. The problem of the release of migration-capable amines under sterilization conditions is not taken into account.

The object of the present invention is therefore to make available a solvent-free two-component polyurethane adhesive, usable as a laminating adhesive, that can be processed at low temperatures, ensures rapid bonding and further processing, and permits sterilization as a cured adhesive in a film composite, such that no primary aromatic amines, constituting migration-capable substances, are contained or occur.

The manner in which the object is achieved by the present invention is evident from the Claims. It consists in making available a solvent-free two-component polyurethane laminating adhesive for adhesive bonding of flexible films, having a reactive component A made up of NCO-containing prepolymers that are manufactured by reacting an excess of toluylene diisocyanate (TDI) with low-molecular-weight diols and/or triols based on polyethers, polyesters, or polyalkylenes, and subsequent removal of the unreacted monomeric diisocyanate. A polyester polyol that is made up in part of long-chain dicarboxylic acids is used as a second component. A composite of film materials adhesively bonded with a corresponding two-component polyurethane adhesive is furthermore made available, which composite is sterilizable with no occurrence of significant quantities of migration-capable constituents, in particular no low-molecular-weight primary aromatic amines.

The two-component polyurethane adhesive that is suitable according to the present invention as a sterilizable laminating adhesive is made up of an isocyanate component A based on reactive polyurethane prepolymers and a polyol component B. It is free of organic solvents. The components are usually highly viscous or solid at room temperature. The constituents can be liquefied or reduced in viscosity by heating to approx. 80° C., and can then easily be mixed and processed.

Aromatic diisocyanates are to be used as monomeric diisocyanates that are suitable for the manufacture of the PU prepolymers of component A. Such aromatic isocyanates are, for example, naphthalene-1,5-diisocyanate (NDI), diphenylmethane-4,4'-diisocyanate (MDI), diphenylmethane-2,4'-diisocyanate, xylylene diisocyanate (XDI), di- and tetraalkyl-diphenylmethane diisocyanate, 4,4'-dibenzyl diisocyanate, 1,3-phenylene diisocyanate, 1,4-phenylene diisocyanate, tetramethylxylene diisocyanate (m-TMXDI, p-TMXDI), or the isomers of toluylene diisocyanate (TDI). It is preferred to use exclusively TDI as a diisocyanate in the prepolymer. In a further embodiment, however, up to 30 wt % of portions of prepolymers from other aromatic diisocyanates can also be used, in particular of prepolymers based on 2,4'-MDI or 4,4'-MDI.

It is also not excluded that portions of known aliphatic diisocyanates can be used in the prepolymer synthesis, such as 4,4'-dicyclohexylmethane diisocyanate (H12MDI), 1-isocyanatomethyl-3-isocyanato-1,5,5-trimethylcyclohexane (isophorone diisocyanate, IPDI), cyclohexane-1,4-diisocyanate, hydrogenated xylylene diisocyanate (H6XDI), 1-methyl-2,4-diisocyanatocyclohexane, dimer fatty acid diisocyanate, tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethylhexane, and 1,12-dodecane diisocyanate (C12DI). At least 70 mol % aromatic isocyanates should be used, however, in particular exclusively aromatic diisocyanates.

Low-molecular-weight diols and/or triols are used as a further constituent of the prepolymer; these alcohols are to have a molecular weight below 2000 g/mol (number-average molecular weight $M_N$ as determinable by GPC). These can be aliphatic and/or aromatic alcohols having 2 or 3 OH groups per molecule. The OH groups can be both primary and secondary.

Included among the suitable aliphatic alcohols are polyalkylene polyols such as, for example, ethylene glycol, 1,2-propanediol, 1,3-propanediol, 2,2-dimethyl-1,3-propanediol, 2-methylpropanediol, 1,6-hexanediol, 2,4,4-trimethylhexanediol-1,6, 2,2,4-trimethylhexanediol-1,6, 1,4-cyclohexanedimethanol, diethylene glycol, triethylene glycol, tetraethylene glycol, dipropylene glycol, butanediol-1,4, pentanediol-1,5, hexanediol-1,6, heptanediol-1,7, octanediol-1,8, and higher homologs or isomers thereof having up to 30 carbon atoms. Trifunctional aliphatic alcohols having a suitable molecular weight, for example glycerol, trimethylolpropane, pentaerythritol, can also be used.

Also suitable are reaction products of low-molecular-weight di- or trifunctional alcohols with alkylene oxides, so-called polyethers. The alkylene oxides by preference comprise 2 to 4 carbon atoms, such as ethylene oxide, propylene oxide, or butylene oxide. Particularly suitable are reaction products of ethylene glycol, propylene glycol-1,2 or -1,3, the isomeric butanediols, hexanediols, octanediol-1,8, neopentyl glycol, 1,4- or 4,4'-dihydroxydiphenylpropane, glycerol, trimethylolethane or trimethylolpropane, hexanetriol, 1,2,6-butanetriol, 1,2,4-trimethylolethane, pentaerythritol, resorcinol, hydroquinone, or sugar alcohols, with the aforesaid alkylene oxides to yield polyether polyols, for example polyethers having a molecular weight of up to 1000 g/mol, such as poly(oxytetramethylene) glycol, polyethylene glycols, polypropylene glycols, alkoxylation products of bisphenol A, alkoxylation products of bisphenol F, of pyrocatechin, of resorcinol, of hydroquinone. Further polyether polyols can be manufactured by the condensation of, for example, glycerol or pentaerythritol with release of water, or they are manufactured by polymerizing tetrahydrofuran (poly-THF).

Polyester polyols can also be used as a polyol. Polyester polyols that by reacting polyfunctional, by preference difunctional alcohols and polyfunctional, by preference difunctional or trifunctional carboxylic acids, are suitable. Instead of free polycarboxylic acids, it is also possible to use the corresponding polycarboxylic acid anhydrides or corresponding polycarboxylic acid esters with alcohols having by preference 1 to 3 carbon atoms. Hexanediol, 1,4-hydroxmethylcyclohexane, 2-methyl-1,3-propanediol, butanetriol-1,2,4, triethylene glycol, tetraethylene glycol, ethylene glycol, polyethylene glycol, dipropylene glycol, polypropylene glycol, dibutylene glycol, and polybutylene glycol are particularly suitable for the manufacture of such polyester polyols.

The polycarboxylic acids can be aliphatic, cycloaliphatic, aromatic, or heterocyclic. They can be substituted as applicable, for example with alkyl groups, alkenyl groups, ether groups, or halogens. Succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimer fatty acid or trimer fatty acid, or mixtures of two or more thereof, are suitable, for example, as polycarboxylic acids. Citric acid or trimellitic acid is preferably suitable as a tricarboxylic acid. Methods for manufacturing such polyester polyols are known to the skilled artisan.

Such polyesters can also be manufactured from lactones, for example based on ε-caprolectone, or from hydroxycarboxylic acids, for example ω-hydroxycaproic acid. Further suitable polyols are polycarbonate polyols.

Polyester polyols of oleochemical origin can also be used. Such polyester polyols can be manufactured, for example, by complete ring opening of epoxidized triglycerides of an at least partly olefinically unsaturated fatty-acid-containing fat mixture with one or more alcohols having 1 to 12 carbon atoms, and subsequent partial transesterification of the triglyceride derivatives to yield alkyl ester polyols having 1 to 12 carbon atoms in the alkyl residue. Dimer diols (Henkel co.) can also be used. Castor oil and derivatives thereof are particularly suitable.

The polyols for manufacturing the polyurethane prepolymers are to have a molecular weight from above 60 to below 2000 g/mol, in particular up to approx. 1000 g/mol. Mixtures of di- and trivalent alcohols can be used so that the average functionality is in the requisite range. It is preferred, however, to use castor oil and/or, in particular, diols such as polyether diols.

The diisocyanates are reacted with the alcohols in a manner known per se, optionally with the addition of aprotic solvents. In order to avoid the formation of higher oligomers, it is useful to utilize for this a large stoichiometric excess of diisocyanates in relation to the diols used, with an NCH:OH ratio greater than 5, in particular greater than 10. If applicable, catalysts known per se can be used to accelerate the reaction between the isocyanate group and the alcohol group. The reaction conditions, and the stoichiometric ratio of monomeric diisocyanate and diol, should be selected so that the OH groups are reacted with isocyanates, and any buildup of polymers having multiple diol modules is minimized.

After completion of the reaction, monomeric diisocyanate is removed as completely as possible from the reaction product; the resulting high-molecular-weight diisocyanate is intended, for purposes of this invention, to contain a maximum of 0.5 wt % monomeric diisocyanate based on the high-molecular-weight diisocyanate, preferably less than 0.1 wt %, in particular less than 0.05 wt %. The purification step can be performed using methods known per se; in particular, the excess monomeric diisocyanate is to be removed by distillation from the reaction mixture. For this, distillation is accomplished in known fashion under vacuum, with the aid of a thin-layer evaporator or thin-film evaporator. Solvent residues are thereby also removed from this precursor.

It is possible to use only one prepolymer, but mixtures of different prepolymers can also be used. A further procedure utilizes a mixture of MDI and TDI prepolymers, in which the quantity of MDI prepolymer can be up to 30 wt %.

Nonpolar polyester polyols are suitable as an OH-containing component B of the two-component polyurethane adhesive suitable according to the present invention. These can be manufactured, for example, by condensation of di- and tricarboxylic acids such as, for example, adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acid, or mixtures thereof with low-molecular-weight diols and triols such as, for example, ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane.

The polyester polyols suitable as OH-containing components are intended to have nonpolar properties, i.e. to be hydrophobic. This can be achieved, for example, by selection of the carboxylic acids. For example, polyester polyols that contain a portion of long-chain $C_8$ to $C_{20}$ dicarboxylic acids, in particular $C_{10}$ to $C_{16}$ dicarboxylic acids, are suitable. Examples thereof are sebacic acid, azelaic acid, dodecanoic acid, or dimer fatty acid. The proportion of these long-chain dicarboxylic acids is to be at least 10 to 50 mol %, in particular between 20 and 40 mol %, based on the dicarboxylic acids contained in the hydrophobic polyester.

The polyester polyols are to have a molecular weight (number-average molecular weight, $M_N$) from 500 to 3000 g/mol, in particular up to 2000 g/mol. They have an average functionality of less than 3.

Furthermore, polyester polyols of oleochemical origin also exhibit nonpolar properties. These can be used in addition to the aforementioned polyester polyols. Polyester polyols of this kind can be manufactured, for example, by complete ring opening of epoxidized triglycerides of an at least partly olefinically unsaturated fatty acid-containing fat mixture with one or more alcohols having 1 to 12 carbon atoms, and subsequent partial transesterification of the triglyceride derivatives to yield alkyl ester polyols having 1 to 12 carbon atoms in the alkyl residue. In particular, castor oil and derivatives thereof are also suitable. The quantity of oleochemical polyols, based on the polyols of component B, can be equal to up to 30 wt %.

In addition to the polyester polyols, component B can also contain further low-molecular-weight tri- to hexavalent alcohols. These increase the crosslinking density of the adhesive. They are preferably polyols having a molecular weight below 400 g/mol, for example trimethylolpropane, trimethylolethane, hexanetriol, pentaerythritol, glycerol, or polyvalent sugar alcohols. The quantity is to be less than 15 wt %, based on the hydrophobic polyester polyols.

The compositions suitable according to the present invention as a two-component polyurethane adhesive can, if applicable, additionally contain catalysts that accelerate crosslinking after application of the adhesive. For example, the organometallic compounds of tin, iron, titanium, or bismuth, such as tin(II) salts of carboxylic acids, dialkyl tin(IV) carboxylates, tin oxides and sulfides, are suitable as catalysts usable according to the present invention. Such compounds are described in the literature and commercially obtainable.

Aliphatic tertiary amines, in particular of a cyclic structure or in polymeric form, are also suitable. Derivatives of morpholine are also suitable. Such compounds can also be used together with the aforesaid metal catalysts.

The composition according to the present invention can furthermore, if applicable, additionally contain stabilizers, adhesion-promoting additives, tackifying resins, fillers, pigments, plasticizers, and/or solvents.

"Stabilizers" are to be understood, for example, as antioxidants, UV stabilizers, or hydrolysis stabilizers. The selection of these stabilizers is determined on the one hand by the principal components of the composition, and on the other hand by the application conditions and the loads to be expected on the adhesively bonded product. For example, hydrolysis stabilizers of the carbodiimide type, or UV stabilizers of the HALS type, can be used.

The compositions according to the present invention can furthermore also contain tackifying resins such as, for example, abietic acid, abietic acid esters, terpene resins, terpene-phenol resins, or hydrocarbon resins; fillers or pigments, in particular also as flake-like particles (e.g. silicates, talc, titanium dioxides, bentonites, calcium carbonate or calcium sulfate, clays, or carbon black); plasticizers, such as esters of aromatic dicarboxylic acids, benzoate esters, medicinal white mineral oils, polybutene or polyisoprene oligomers, and hydrogenated derivatives; drying agents such as tetraalkyoxysilanes, alkyltrialkoxysilanes, or zeolites; or thixotroping agents.

Adhesion promoters can also be added. These are, in particular, organofunctional silanes such as hydroxy-functional, (meth)acryloxy-functional, amino-functional, epoxy-functional, or also isocyanate-functional silanes, which contain two or three hydrolyzable alkoxy groups, in particular methoxy or ethoxy groups. If these adhesion promoters contain groups that are reactive with NCO groups, it is useful for them to be mixed into component B. These silanes can also react, in the curing adhesive, with the reactive groups of component A or B, and are incorporated into the polymer.

The adhesive suitable according to the present invention for adhesive bonding of composite materials is a two-component adhesive. The various additives and further constituents can be contained in one of the two components. Drying agents can be contained, in particular, in component B. Care must be taken in this context, if the additives contain functional groups that are reactive with respect to NCO groups, that they should usually not be contained, or contained only in small quantities, in component A. Otherwise the shelf stability of the adhesive cannot be guaranteed.

The mixing ratio of component A with component B is to be from 6:1 to 2.5:1, in particular from 5:1 to 3:1. Greater proportions by weight of the NCO-reactive constituents are used because of the use of a high-molecular-weight NCO-reactive prepolymer, resulting in improved dispensing properties for the components and enhanced application reliability.

The two components of the adhesive either are highly viscous, or can even be solid at room temperature. To ensure good miscibility, solid adhesive components are heated before mixing. The viscosity of the polyol component is to be less than 5000 mPas at 80° C., in particular at 60° C. The isocyanate component is to have a viscosity below 5000 mPas at 60° C. (Brookfield Thermosel, EN ISO 2555). It is preferred, when the adhesive components are mixed, that they have a similar viscosity, i.e. that they differ by less than 2000 mPas. The adhesive is to have, immediately after mixing of the constituents, a viscosity below 5000 mPas, in particular below 3000 mPas (measured at 60° C.).

Mixing of the adhesives can be carried out using known methods. On the one hand it is possible to disperse the component that is solid at room temperature in the viscous component using high-speed stirring equipment, and thereby dissolve it. Another procedure heats one or both components so that mixing of the components while hot, in a liquid state, is possible. A third procedure mixes the flowable components, for example, using a rotor/stator mixer, yielding a forced mixture of the components. The components are preferably mixed at 30 to 80° C., in particular up to 60° C.

Immediately after mixing, the adhesive is applied onto the substrate. The known films can be used as a substrate. These are, for example, those based on polyesters, polyvinyl chloride, polyamides, polyolefins, polyacrylates, or metal foils. The films have a thickness between 5 and 100 µm. These are flexible substrates. The adhesive can be applied onto the film using known methods, for example by spray application, roller application, or print application. The layer thickness of the adhesive on the substrate is to be 2 to 25 µm, in particular from 5 to 15 µm. Immediately after application, the second film to be bonded is placed onto the adhesive surface. Pressure can be exerted in this context if applicable, and crosslinking can be accelerated by an elevated temperature. A method and apparatus for laminating films to one another are known. Multiple films can also be joined to one another to yield multi-layer films.

The composite films manufactured using the two-component polyurethane adhesive suitable according to the present invention can be stored immediately after manufacture, or further processed. A rapid buildup of adhesion is achieved due to the high reactivity of the mixture of components A and B. In addition, complete reaction of the reactive groups in a short time is ensured.

The isocyanate-containing adhesive suitable according to the present invention contains only small proportions of monomeric aromatic diisocyanates. This is ensured by the way the process is managed during manufacture. The concentration of monomeric aromatic diisocyanates is correspondingly low in the applied two-component adhesive as well. A hydrolysis reaction of possible monomeric diisocyanates with water is decreased by the rapid reaction of the two components. As a result, the proportions of aromatic diamines in the adhesively bonded substrate are very low.

The composite materials adhesively bonded according to the present invention can be further processed using known actions. Extended tempering, i.e. heating and holding the materials, prior to processing is not necessary. They can be immediately coiled, transported, or further processed. In particular, they are suitable for being further processed into sterilization-capable objects. These can be objects for medical application purposes, but it is likewise possible to manufacture sterilizable food packages. The corresponding packages are, in this context, manufactured from the composite materials. The packages either can be subjected to sterilization before being filled with the contents, or are sterilized along with the contents after filling.

The usual sterilization methods can be utilized. For example, it is possible to sterilize such packages using high-energy radiation, for example UV radiation, electron radiation, or radioactive radiation. Care must be taken in this context that no damage to the package material (in this case, the film) occurs as a result of the radiation. Another sterilization method operates with elevated temperature and moisture. For example, such packages are acted upon at approx. 130° C. by steam under pressure, for a period of up to 45 minutes. Germs are killed under these conditions; the composite film and the adhesive bond remain intact. The adhesive is also not substantially degraded. There is no increase in migration-capable amines in the sterilized package.

A further subject of the invention is composite materials, manufactured with an adhesive suitable according to the present invention, that can be sterilized. In this context, a film is coated with an adhesive suitable according to the present invention and bonded to a further film. It is possible to repeat this operation as applicable so that multi-layer composite films are obtained. Immediately after bonding, the resulting films are rolled up. In an embodiment, it is possible to further process such films without complex post-processing. Corresponding packages are cut out of the film materials, shaped, and the individual parts are joined to one another. The packages can then be subjected to a sterilization operation. Curing of the adhesive has completely occurred in this context. Further processing, and determination of the primary aromatic amines, can already be carried out, for example, 24 or 48 hours after manufacture. The stability of the adhesive used according to the present invention is so high that breakdown of the crosslinked polyurethane is not observed even at elevated temperature and when acted upon by moisture. The quantity of migration-capable extractable primary aromatic amines produced or contained in the composite film as a result of the adhesive layer is less than 5 ppb.

According to the present invention, an advantage of the films adhesively bonded according to the present invention and the packages manufactured therefrom is that they do not form any migration-capable aromatic amines. For food packages and medical packages, it is a regulatory requirement that they comprise only a small proportion of such primary aromatic amines. The methods for determining such amines are defined in VO 1935/2004/EC, Guideline 2002/72 EC, including Supplements, the contents of each of which are incorporated herein by reference in their entirety. These measured amines are usually not determined individually, but are measured by way of total quantities. These aromatic amines can be produced as residues of the educts from manufacture of the materials, for example the adhesive. They can also, however, be produced upon chemical reaction of the adhesive, or in the context of a chemical breakdown of the adhesive layer. This is prevented when the adhesives selected according to the present invention are used.

Utilization of the two-component polyurethane adhesive according to the present invention allows the manufacture of composite materials that, immediately after manufacture, after storage, and even after sterilization, form only small proportions of migration-capable aromatic primary amines. The requisite low limit values can thus be complied with at all times.

The Examples below explain the invention.

EXAMPLE 1

Polyester Polyol 294 g neopentyl glycol and 128 g diethylene glycol are mixed, and dewatered by being heated under vacuum. To this, 456 g sebacic acid and 250 g isophthalic acid are added. The mixture is heated to 230 to 250° C. while stirring. The reaction has ended after 12 hours.

OH number=33 mg KOH/g
Acid number<2
Viscosity=4200 mPas at 80° C.

EXAMPLE 2

Polyester Polyol 319 g neopentyl glycol and 92 g diethylene glycol are mixed, and dewatered by being heated under vacuum. To this, 239 g sebacic acid and 495 g adipic acid are added. The mixture is heated to 230 to 250° C. while stirring. After 12 hours the polyester is decanted.

OH number=54 mg KOH/g
Viscosity=500 mPas at 80° C., 2000 mPas at 50° C.

EXAMPLE 3

Prepolymer 100 g of a diol (PPG, approx. 1000 g/mol) is mixed with 100 g TDI; 0.5 g DBTL is then added, and reacted at the resulting reaction temperature. After 2 hours, monomeric TDI is removed from the mixture under vacuum.

The prepolymer has a viscosity of 2290 mPas at 40° C.

EXAMPLE 4

Prepolymer 46 g of a polyol (polyester diol of adipic acid and hexanediol, OH number 84 mg/KOH/g) and 4 g trimethylolpropane are mixed with 82.5 g TDI; approx. 0.1 g tosyl isocyanate is then added, and reacted at 60 to 75° C. After 1.5 hours, monomeric TDI is removed from the mixture under vacuum.

The prepolymer has a viscosity of 8400 mPas at 50° C., or 700 mPas at 50° C.

EXAMPLE 5

75 g each of a polyol according to Example 1 and according to Example 2 are mixed. 50 g of a prepolymer according to Example 4 is added to this. The mixture is immediately applied.

EXAMPLE 6

75 g each of a polyol according to Example 1 and Example 2 are mixed with 25 g of the prepolymer according to Example 3 and 75 g of a prepolymer according to Example 4. Immediately thereafter, the mixture is applied onto a film.

EXAMPLE 7

As a comparative experiment, two films were adhesively bonded using a low-monomer laminating adhesive according to WO 2005/097861, Example 1.
Bonding:
CPP film: Cast polypropylene (Nordenia), type PP0946.080 (thickness=50 μm)
PET film: Polyethylene terephthalate film, type RNK 12 (thickness=12 μm).

15 μm of an adhesive mixture according to Example 5 or 6 is applied onto a PET film at 50° C. using a blade, and immediately bonded to a CPP film.

The films are held for 48 hours; a package can then be manufactured.

These films can then be sterilized for 45 minutes at 130° C. in steam.

A film held for 3 days, with and without sterilization, was extracted per Guideline 2002/72 EC, and tested for aromatic amines.

| Adhesive | Held 3 days RT | 7 days RT | 3 days, sterilized |
|---|---|---|---|
| Example 5 | 11 ppb | <10 ppb | <10 ppb |
| Example 6 | 10 ppb | <10 ppb | <10 ppb |
| Comparison 7 | approx. 25 ppb | 20 ppb | >15 ppb |

It is apparent that after 3 days, the quantity of extractable aromatic amines does not increase further.

The results are no worse even after sterilization. The comparative experiment using polyols of low hydrophobicity is less favorable.

What is claimed:

1. A method of bonding sterilizable composite films, comprising
providing a component A made up of NCO-group-containing prepolymers, manufactured from at least one polyether alcohol, polyester alcohol, and/or polyalkylene alcohol having a functionality of 2 or 3 and having a molecular weight ($M_N$) below 2000 g/mol, reacted with a molar excess of TDI and with removal of the unreacted monomeric TDI;
providing a component B containing at least one nonpolar, 2- or 3-functional polyester polyol, manufactured from di- and/or trivalent polyether polyols or polyalkylene polyols reacted with dicarboxylic acids or derivatives thereof, such that at least 10 to 50 mol% aliphatic $C_8$ to $C_{20}$ dicarboxylic acids must be contained, wherein component B contains less than 15 wt% 4 to 6 functional polyols and wherein at least one of component A or component B further comprises adjuvants and additives;
mixing component A and component B to form a laminating adhesive;
applying the laminating adhesive to a surface of a first film;
applying a second film over the applied laminating adhesive; and
curing the adhesive to form the bonded, sterilizable composite film.

2. The method according to claim 1, wherein the adhesive components A and B are mixed at temperatures between 30 and 80° C.

3. The method according to claim 2, wherein the mixed adhesive has, at 60° C., a viscosity of less than 5000 mPas.

4. The method according to claim 1, wherein component A contains less than 0.5 wt% monomeric TDI.

5. The method according to claim 1, wherein component A contains less than 0.05 wt% monomeric TDI.

6. The method according to claim 1, wherein the low-molecular-weight polyols of component A have a molecular weight ($M_N$) from 60 to 1000 g/mol.

7. The method according to claim 1, wherein the polyols of component B are hydrophobic polyester polyols having a molecular weight ($M_N$) below 3000 g/mol.

8. The method according to claim 1, wherein the polyols of component B are hydrophobic polyester polyols having a molecular weight ($M_N$) below 3000 g/mol and the polyester polyols of component B contain 20 to 40 mol% $C_{10}$ to $C_{16}$ dicarboxylic acids.

9. The method according to claim 1, wherein component A additionally contains an NCO-containing prepolymer based on low-molecular-weight polyether alcohols, polyester alcohols, and/or polyalkylene alcohols reacted with a molar excess of MDI, the MDI-group-containing prepolymer having a residual MDI monomer content of less than 0.5%.

10. The method according to claim 1, wherein the first and second films are individually selected from polyesters, polyvinyl chloride, polyamides, polyolefins, polyacrylates and metal films.

11. The use according to claim 1, wherein the bonded composite film is sterilized with UV rays and/or at temperatures of up to 135° C.

12. The method according to claim 1, wherein the bonded composite film, after 48 hours of curing, contains less than 5 ppb extractable aromatic amines (measured per VO 1935/2004/EC).

13. The method according to claim 1, wherein component B additionally contains up to 30 wt% oleochemical polyols.

14. A method of bonding sterilizable composite films, comprising providing a component A made up of NCO-group-containing prepolymers, manufactured from at least one polyether alcohol, polyester alcohol, and/or polyalkylene alcohol having a functionality of 2 or 3 and having a molecular weight ($M_N$) below 2000 g/mol, reacted with a molar excess of TDI and with removal of the unreacted monomeric TDI;

providing a component B containing up to 30 wt% oleochemical polyols and further containing at least one 2- or 3-functional polyester polyol, manufactured from di- and/or trivalent polyether polyols or polyalkylene polyols reacted with dicarboxylic acids or derivatives thereof, such that at least 10 to 50 mol% aliphatic $C_8$ to $C_{20}$ dicarboxylic acids must be contained, wherein component B contains less than 15 wt% 4 to 6 functional polyols and wherein at least one of component A or component B further comprises adjuvants and additives;

mixing component A and component B to form a laminating adhesive;

applying the laminating adhesive to a surface of a first film;

applying a second film over the applied laminating adhesive; and curing the adhesive to form the bonded, sterilizable composite film.

15. The method according to claim 1, wherein component B contains only 2-functional polyester polyols, 3-functional polyester polyols or 2- and 3-functional polyester polyols.

16. The method according to claim 1, wherein component B contains no polyols having a functionality of 4 to 6.

* * * * *